Jan. 8, 1963 V. MILENKOVIC 3,071,984
AUTOMATIC TRANSMISSION FOR A BICYCLE OR THE LIKE
Filed Nov. 2, 1959 4 Sheets-Sheet 1
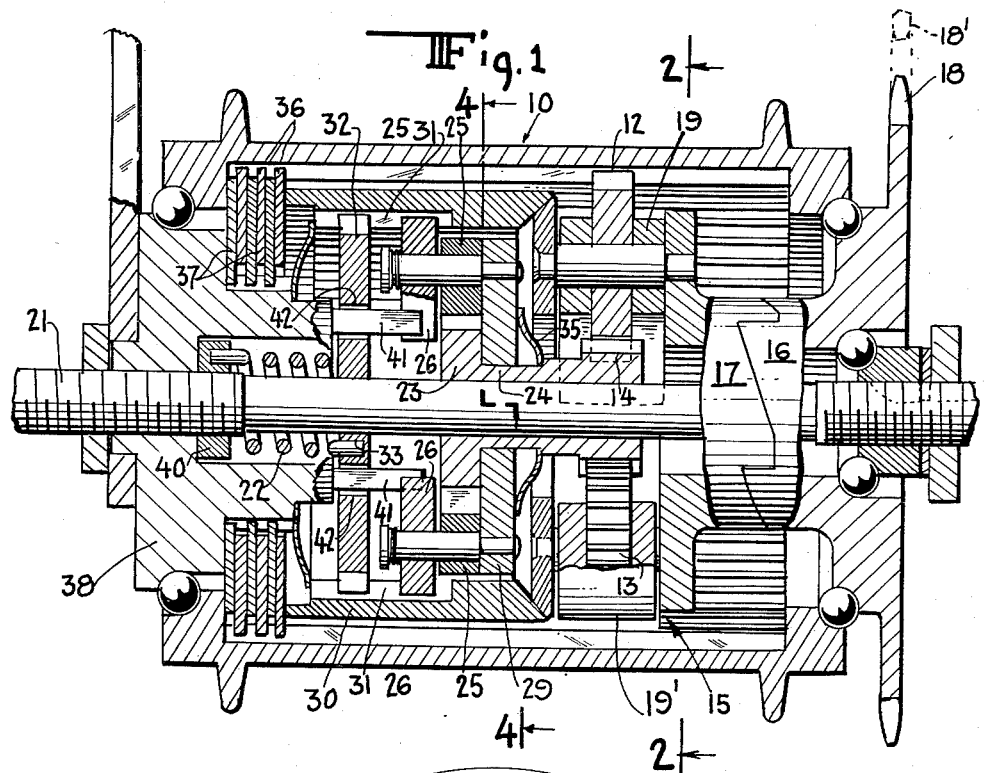
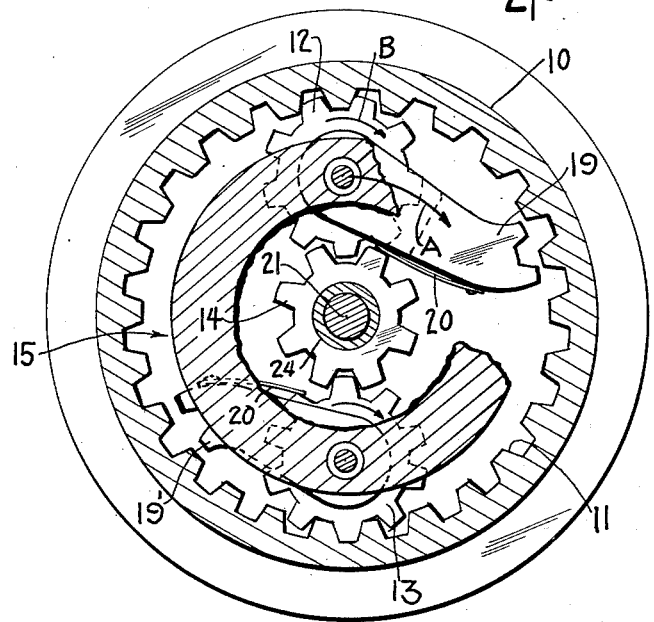
Fig. 2
INVENTOR
VELJKO MILENKOVIC
BY
ATTORNEY

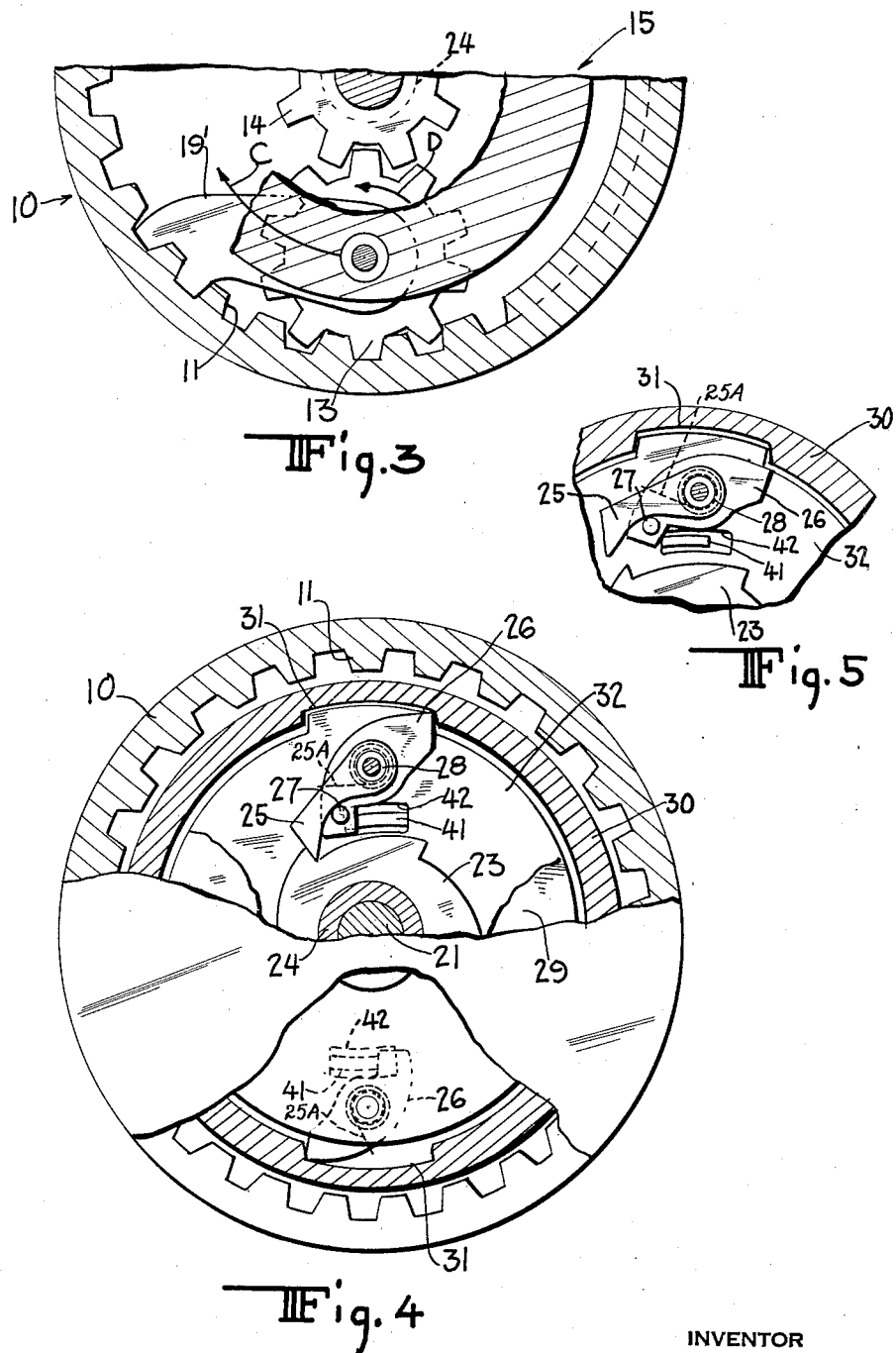

INVENTOR
VELJKO MILENKOVIC
BY
ATTORNEY

INVENTOR
VELJKO MILENKOVIC

United States Patent Office 3,071,984
Patented Jan. 8, 1963

3,071,984
AUTOMATIC TRANSMISSION FOR A BICYCLE
OR THE LIKE
Veljko Milenkovic, Chicago, Ill., assignor to American Machine and Foundry Company, a corporation of New Jersey
Filed Nov. 2, 1959, Ser. No. 850,486
17 Claims. (Cl. 74—751)

This invention relates to an automatic transmission for a bicycle or the like.

It is an object of the present invention to provide an automatic transmission with a direct drive for low ratio gear operation and with a planetary drive for high ratio gear operation (hereinafter sometimes referred to as low-gear and high-gear operation). The better torque transmission of the direct drive is of greater importance in low-gear operation than in high-gear operation.

It is another object of the present invention to provide an automatic transmission which automatically shifts from high-gear operation to low-gear operation if the torque applied to the transmission exceeds a predetermined limit, i.e., when the torque exerted by the cyclist on the pedal crank of a bicycle exceeds a predetermined limit.

It is a further object of the present invention to provide an automatic transmission which automatically shifts from low-gear operation to high-gear operation when the angular speed of the hub exceeds the angular speed dictated by the pedal crank, i.e., when coasting occurs. The transmission will not return to low-speed operation if the torque applied to the transmission by the pedal crank falls below the predetermined limit after having exceeded it, unless the aforesaid difference in angular speed takes place.

It is a still further object of the present invention to provide an automatic transmission with rapid, positive shifting from either type of operation to the other type of operation and which precludes the possibility of a neutral, disconnected condition.

It is still another object of the present invention to provide an automatic transmission which is completely located within the hub of the bicycle or the like.

It is another object of the present invention to combine an automatic transmission with a coaster brake which operates independently of the transmission and thus remains operative in the case of transmission failure.

It is still another object of the invention to combine an automatic transmission with a coaster brake which is responsive to a pedal rotation in a direction opposite to the driving rotation.

Other objects and features of the invention will appear as the description of the particular physical embodiments selected to illustrate the invention progresses. In the accompanying drawings, which form a part of this specification, like characters of reference have been applied to corresponding parts throughout the several views which make up the drawings.

FIG. 1 is an axial cross-section of an automatic transmission and a coaster brake according to the present invention.

FIG. 2 is a radial cross-section on line 2—2 of FIG. 1, illustrating the elements in their positions at high-gear operation.

FIG. 3 is a view similar to FIG. 2 illustrating the elements in their positions at low-gear operation.

FIG. 4 is a radial cross-section on line 4—4 of FIG. 1, illustrating the elements in their positions at high-gear operation.

FIG. 5 is a view similar to FIG. 4, illustrating some elements of FIG. 4 in low-gear operation.

Figure 6:
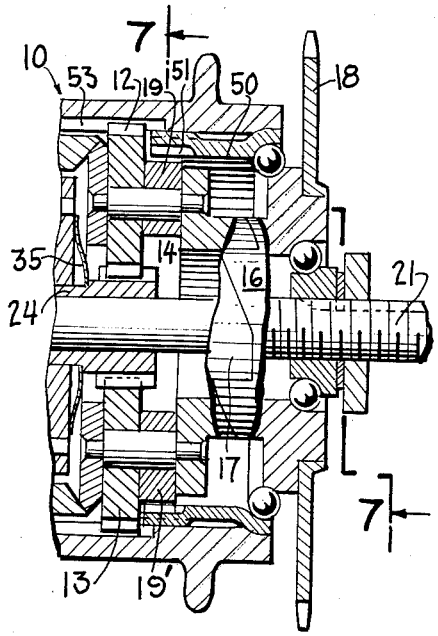
FIG. 6 is an axial cross-section illustrating a different embodiment of the invention.

Referring now to the figures, and particularly to FIGURES 1, 2 and 3, the numeral 10 designates a bicycle hub. The inside wall of the bicycle hub 10 is formed with an internal ring gear 11, meshing with two planetary gears 12 and 13. The planetary gears 12 and 13 also mesh with a centrally located sun pinion 14. The two planetary gears 12 and 13 are driven by a planetary cage 15 which is in turn driven by two sprockets 18 and 18' through a helical coupling consisting of a helical coupler 16 and a mating helical coupler 17, shown in FIGURE 1. The sprockets 18 and 18' are connected by a conventional chain, not shown.

FIGURES 1, 2 and 3 further illustrate coupling means comprising a pair of direct-drive pawls 19 and 19' for connecting the planetary gears 12 and 13 and the hub 10. The pawl 19 is shown in two different positions in FIGURES 2 and 3, respectively. In the disengaged, normal or high-gear position of the direct-drive pawl 19, shown in FIGURE 2, relative rotation between the planetary gear 12 and the hub 10 is possible, while in the engaged or low-gear position of the direct-drive pawl 19, shown in FIGURE 3, the direct-drive pawl 19 locks the planetary gear 12 and the hub 10 for a common rotation. As shown in FIGURE 1, the direct-drive pawls 19 and 19' straddle the planet gears 12 and 13, respectively. One end of a leaf spring 20 is secured to that side of the direct-drive pawl 19 which faces the sun pinion 14. The other end of this spring 20 engages a flank of a tooth of the planet gear 12. A similar spring controls the direct-drive pawl 19'.

FIGURE 2 illustrates the high-gear or normal positions of the involved elements, and FIGURE 3, the low-gear positions of the same elements. As will be explained later in detail, the sun pinion 14 is automatically held against rotation in a clockwise direction, as seen in FIGURES 2 and 3, during high-gear operation of the transmission, while the sun pinion 14 is automatically released to freely rotate in this direction at the switching from high-gear to low-gear operation. The sun pinion 14 which is mounted for rotation on a shaft 21, is again held against rotation in a clockwise direction when the transmission shifts back into high-gear operation.

During high-gear or normal operation of the transmission, FIGURE 2, the planetary gears 12 and 13, driven by the planetary cage 15 in a clockwise direction indicated by the arrow A in FIGURE 2, progresses around the sun pinion 14 in a clockwise direction. Since in this mode of operation the sun pinion 14 cannot rotate with the planetary gears 12 and 13 in a clockwise direction around the shaft 21, the planetary gears 12 and 13 are forced to additionally rotate on their own axes also in a clockwise direction, as indicated by the arrow B. Hence the peripheral angular speed of the planetary gears 12 and 13 which is imparted to the hub 10 by means of the internal ring gear 11, exceeds the angular speed with which the planetary gears 12 and 13 are driven, i.e., the angular speed at which the bicycle pedal causes the sprocket 18 to turn. As the planetary gears 12 and 13 rotate, the leading flanks of successive teeth engage the springs 20. In the present instance, in the case of a clockwise rotation of the planetary gears 12 and 13 on their axes, the springs 20 and with it the direct-drive or coupling pawls 19 and 19' are urged in a clockwise direction, holding the direct-drive pawls 19 and 19' disengaged from the internal ring gear 11 of the hub 10. Thus during normal operation, i.e., when the sun pinion 14 is held against clockwise rotation, the planetary system is effective to provide high-gear operation.

It will now be assumed that the transmission has been shifted to low-gear operation, FIGURE 3, and that the sun pinion 14 is free to rotate in a clockwise direction. Driven by the sprocket 18, the planetary cage 15 and the plantary gears 12 and 13 again progress in a clockwise direction as indicated by the arrow C. However, the sun pinion 14 is now free to rotate in a clockwise direction with the planetary gears 12 and 13. The drag of the internal ring gear 11 of the hub 10 on the planetary gears 12 and 13, tending to rotate it in a counter-clockwise direction, will be effective, and the planetary gears 12 and 13 will rotate in a counter-clockwise direction on their axes, as indicated by the arrow D in FIGURE 3. As soon as the direction of rotation of the planetary gears 12 and 13 is counter-clockwise, the previously lagging flanks of the teeth of the planetary gears 12 and 13 will become the leading flanks which now urge the springs 20 toward the internal ring gear 11, forcing the direct-drive or coupling pawls 19 and 19' to engage the internal hub gear 11. The direct-drive or coupling pawls 19 and 19' now lock the hub 10 to the planetary cage 15, respectively, for a common rotation around the shaft 21. Thus when the sun pinion 14 is released for rotation in a clockwise direction, low-gear, direct coupling is achieved.

Figure 7:
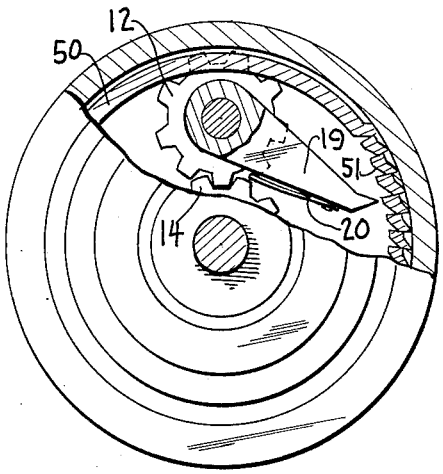
FIG. 7 is a radial cross-section on line 7—7 of FIG. 6.

The embodiment illustrated in FIGURES 6 and 7 will now be described. In this embodiment insert 50 with ratchet teeth 51 is provided integral with the hub 10. The pawls 19 and 19', when urged outwardly by the springs 20, engage these teeth 51. The planetary gears 12 and 13 mesh with the teeth 53 splined in the hub 10. Thus independent sets of teeth for the planetary gears 12 and 13 and for the coupling pawls 19 and 19' are provided, each set being designed for its particular purpose.

The operation of this embodiment is identical with that of the previously described embodiment and a detailed explanation appears superfluous.

Figure 8:
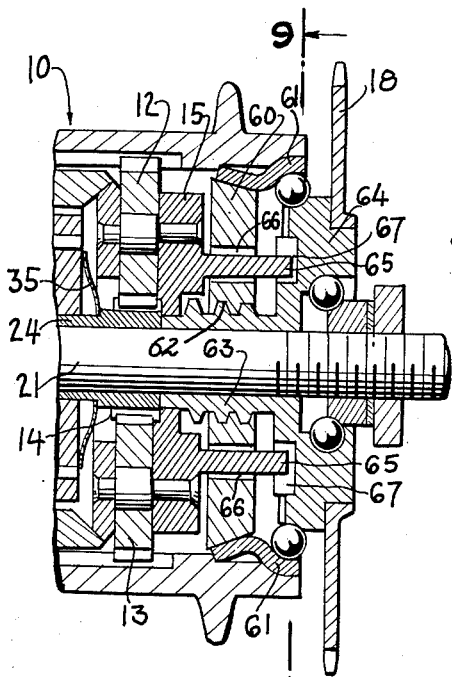
FIG. 8 is an axial cross-section illustrating another embodiment of the present invention.

The embodiment illustrated in FIGURES 8 and 9 will now be described. In this embodiment a cone coupled or selective drive replaces the coupling pawls 19 and 19' and the associated ratchet, i.e., low-gear transmission is taken over by a cone couple.

A cone plate 60 and a cone insert 61 provide the conical cooperating surfaces. The cone plate 60 has a central hole formed with a spiral groove 62. This spiral groove 62 rides on a spiral worm on a drive sprocket hub 64 which is rigid with the drive sprocket 18 to rotate therewith around the shaft 21.

Two lugs 65, rigid with the planetary cage 15, extend through two holes 66 in the cone plate 60 and engage with their ends recessed cavities 67 in the sprocket hub 64. The holes 66 and the recessed cavities 67 subtend a larger angle relative to the shaft 21 than do the lugs 65 so that the lugs 65 are free to angularly shift in the holes 66 and the recessed cavities 67 within predetermined limits.

Let us first assume normal or high-gear operation, i.e., the sun gear is held against clockwise rotation and the planetary gears 12 and 13 rotate on their axes imparting an angular speed to the hub 10, and thus to the cone insert 61, which exceeds the angular speed of the sprocket 18, the sprocket hub 64, the lugs 65 and the cone plate 60.

Figure 9:
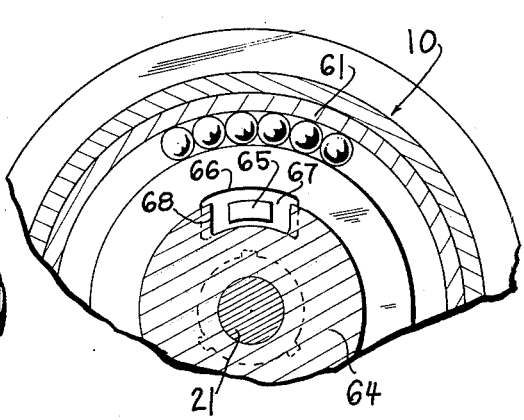
FIG. 9 is a radial cross-section on line 9—9 of FIG. 8.

Since the sprocket hub 64 rotates in a clockwise direction as seen in FIGURE 9, the lugs 65 will rest against the walls 68 of the recessed cavities 67 driving the planetary gear cage 15 and thus the planetary gears 12 and 13 at the angular speed of the sprocket 18. The spiral groove 62 and the worm 63 are so directed that, if the conical plate 60 rotates faster than the worm 63, the conical plate will be shifted towards the left in FIGURE 8 as it rides along the worm 63. Thus as the cone plate 60 contacts the cone insert 61 and is imparted an angular speed exceeding that of the worm 63, it will advance along the worm to the left and automatically disengage itself from the cone insert 61. The cone plate is free to do so since the width of the holes 66 therein exceed the width of the lugs 65. Thus the cone drive is ineffective during the high-gear operation as were the locking pawls 19 and 19' in the previously described embodiment.

During low-gear operation, i.e., when the sun gear 14 is free to rotate in a counter-clockwise direction and the planetary gears 12 and 13 are thus not positively driving the hub 10, the angular velocity of the hub 10 tends to be less than the angular velocity of the worm 63 which is at all times the velocity of the sprocket 18. Hence the worm 63 urges the cone plate 60 into engagement with the cone insert 61 and the cone-drive takes over during low-gear operation.

The automatic, torque-responsive control of the sun gear 14 will now be explained. Essentially the torque exerted on the sun pinion 14 by the planetary gears 12 and 13 is compared to the torque of a torque-preloaded torsion spring 22, the torque-limiting spring, FIGURE 1, which surrounds the shaft 21.

Referring now to FIGURES 1, 4 and 5, the torque-comparing mechanism extending between the sun pinion 14 and the torsion spring 22 will now be described.

A high-gear ratchet 23 is rigidly connected to a sleeve 24 of the sun pinion 14. At high-gear or normal operation, a spring-loaded high-gear pawl 25 engages the high-gear ratchet 23 and prevents its rotation in a clockwise direction. Thus the sun pinion 14 is also held against rotation in a clockwise direction. A spring-loaded shifting pawl 26 has locking pins 27 which normally abut the high-gear pawls 25 in their normal engaged position. Both pawls 25 and 26 tensioned by a conventional torsion spring 25A pivot on a stud 28 of a shifting ring 29 which concentrically and rotatably surrounds the sleeve 24 of the sun pinion 14. Although only one high-gear pawl 26 and one shifting pawl 25 are described, two such pawls are provided, as shown in FIGURE 1.

A drag spring 35 wedged between the sun pinion sleeve 24 and the shifting ring 29 urges the shifting ring 29 to follow the direction of rotation of the sun pinion 14 at all times.

A brake reaction ring 30 concentrically surrounds the shaft 21. The planetary cage 15 contacts the brake-reaction ring 30 along a ring-shaped area for a common axial shifting motion. Brake discs 36 are splined to the brake-reaction ring 30, while alternately positioned brake discs 37 are splined to the brake-ground spline 38 which is rigid with the frame of the bicycle or the like.

The brake-reaction ring 30 has a camming surface 31 engaging the shifting pawl 26. In FIGURE 4 the shifting pawl 26 is shown latched to the camming surface 31 of the brake-reaction ring 30 in its normal position for high-gear operation. The brake-reaction ring 30 is keyed to a torque-limiting plate 32. The free end of the torsion spring 22 is attached to the torque-limiting plate 32 at 33. The other end of the torque-limiting torsion spring 22 is secured to the spring-anchor nut 40 which is jammed onto the shaft 21 so that it can not turn thereon. Two stationary tripping lugs 41, rigid with the brake-ground spline 38, extend through elongated holes 42 (FIGURES 1, 4 and 5) in the torque-limiting plate 32. These tripping lugs 41 cooperate with the non-camming end of the pivoted shifting pawls 26 to shift from high-gear to low-gear operation.

The spring 22 is torque-preloaded by the stationary tripping lugs 41 which abut against one side of the elongated holes 42, holding the torque-limiting plate 32 against rotation in the direction in which it is urged by the torsion spring 22. The holes 42 are dimensioned for the tripping lugs 33 to ride within the holes 42 if the torque-comparing mechanism containing the torque-limiting plate 32 is rotated against the action of the torsion spring 22 during switching from high-gear to low-gear operation.

In operation, the system is initially in high-gear or normal operation which will now be described. The torque-limiting spring 22 retains the torque-limiting plate 32 and the brake-reaction ring 30 keyed thereto in their normal positions so that the shifting pawls 26 are held cammed by the brake-reaction ring 30 and the high-gear pawls 25 engage the high-gear ratchet 23 as shown in FIGURE 4. Rotation in a clockwise direction of the high-gear ratchet 23 and of the sun pinion 14 rigid therewith is thus prevented. Consequently the planetary gears 12 and 13 are forced to rotate around their axes in a clockwise direction, holding the direct-drive or coupling pawls 19 and 19' disengaged, and driving the hub 10 at an angular speed exceeding the speed of the planetary cage 15 and thus of the pedal of the bicycle or the like, as previously explained.

If the torque exerted by the sun pinion 14 on the brake-reaction ring 30 exceeds the torque exerted on the brake-reaction ring 30 by the torque-limiting spring 22, the torque-comparing mechanism, i.e., torque-limiting plate 32, the brake-reaction ring 30, the high-gear pawls 26, the shifting pawls 25, the shifting ring 29, and the high-gear ratchet 23 rotate as a rigid assembly through a small angle together with the sun pinion 14 against the action of the torsion spring 22, shifting to a low-gear operation is initiated.

Since the tripping lugs 41 do not participate in this rotation but remain stationary, they force the rotated shifting pawls 26 to pivot on their studs 28 from the position shown in FIGURE 4 to the position shown in FIGURE 5 and thereby to unlatch from the brake-reaction ring 30. The pivotal motion of the shifting pawls 26 urges the pins 27 to lift the high-gear pawls 25 out-of-engagement with the high-gear ratchet 23, see FIGURE 5, which ratchet 23 is now free to rotate in a clockwise direction, permitting the sun pinion 14 to similarly rotate.

The free clockwise rotation of the sun pinion 14 causes engagement of the direct-drive or coupling pawls 19 and 19' with the internal ring gear 11 of the hub 10, as explained above. Thus, direct-drive low-gear operation is established by the shifting step in response to the excess torque applied to the pedal of the bicycle or the like.

The unlatching of the shifting pawls 26 from the brake-reaction ring 30 and the disengagement of the high-gear pawls 25 from the high-gear ratchet 23, transforms the previously rigid torque-comparing mechanism into three separate parts.

The torsion-limiting spring 22 returns the brake-reaction ring 30 and the torque-limiting plate 31 to their normal positions determined by the tripping lugs 41. The shifting ring 29 together with the high-gear pawls 25 and the shifting pawls 26 are retained in their angularly displaced positions shown in FIGURE 5, the shifting pawls 26 unlatched from the brake-reaction ring 30 and the high-gear pawls 25 disengaged from the high-gear ratchet 23. The shifting pawls 26 are now located opposite the raised section of the brake-reaction ring 30. The high-gear ratchet 23 rotates in a clockwise direction together with the sun pinion 14 and its sleeve 24.

These conditions prevail until the angular speed of the hub 10 exceeds the angular driven speed of the planetary gears 12, i.e., the angular pedal speed. A lowering of the driving torque below the predetermined limit which has caused the shift from high-gear to low-gear operation, will not cause a shift from low-gear to high-gear operation.

Assuming now that the angular hub speed slightly exceeds the pedal speed, i.e., coasting occurs, the planetary gears 12 are forced to rotate in a clockwise direction on their axes, arrow B in FIGURE 2. This clockwise rotation of the planetary gears 12 and 13 disengages the coupling pawls 19 and 19' from the internal ring gear 11 of the hub 10 and urges the sun pinion 14 to rotate in a counter-clockwise direction.

The drag spring 35, wedged between the sleeve 24 of the sun pinion 14 and the shifting ring 29, displaces the shifting ring 29 in a counter-clockwise direction, returning the latter to its normal position. The high-gear pawls 25 and the shifting pawls 26 are returned to their normal positions together with the shifting ring 29, since they are pivoted to the stud 28 on the shifting ring 29. The shifting pawl 26 is again latched to the brake-reaction ring 30 and the high-gear pawl 25 engages the high-gear ratchet 23.

Normal positions of all elements have thus been re-established and high-gear operation will resume.

Figure 10:
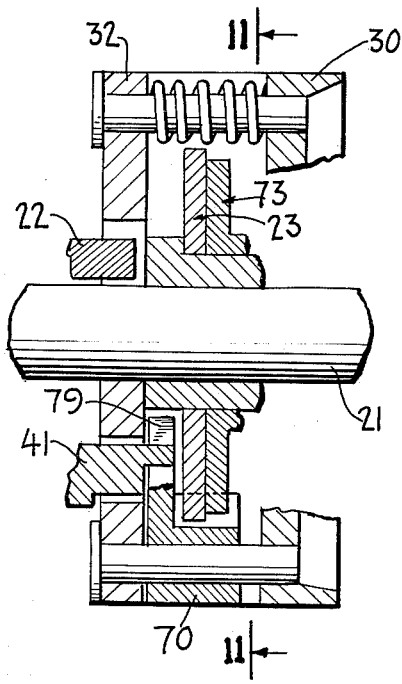
FIG. 10 is an axial cross-section illustrating still another embodiment of the present invention.

In the embodiment shown in FIGURES 10 and 11, the shifting ring 29 carrying the high-gear pawls 25 and the locking-pawls 26 is replaced with the structure which will now be described in detail.

Two ratchet pawls 70 are pivotally mounted on studs 71 extending between the reaction ring 30 and the torque-limiting plate 32. A ratchet masking disc 73 formed with lobes 74 is rotatable on the shaft 21 concentrically with the ratchet 23. The lobes 74 on the ratchet masking disc 73 subtend an angle which is substantially equal to the angle subtended by the notches 75 between the ratchet teeth and by the ridges 76 interconnecting the notches 75 to form the ratchet teeth. Hence, a relative angular displacement between the ratchet 23 and the ratchet masking disc 73, aligning the lobes 74 of the masking disc 73 with the notches 75 of the ratchet 23, will prevent the disengaged ratchet pawls 70, which have a width to extend over both the ratchet 23 and the masking disc 73, from re-engagement with any of the notches 75. A slot 77 in the masking disc 73 and a pin 78 on the ratchet 23 extend into the slot 77, permitting just such a relative angular displacement between the masking disc 73 and the ratchet 23.

The ratchet pawls 70 have extensions 79 which contact the tripping lugs 41 which are rigid with the bicycle frame.

Figure 11:
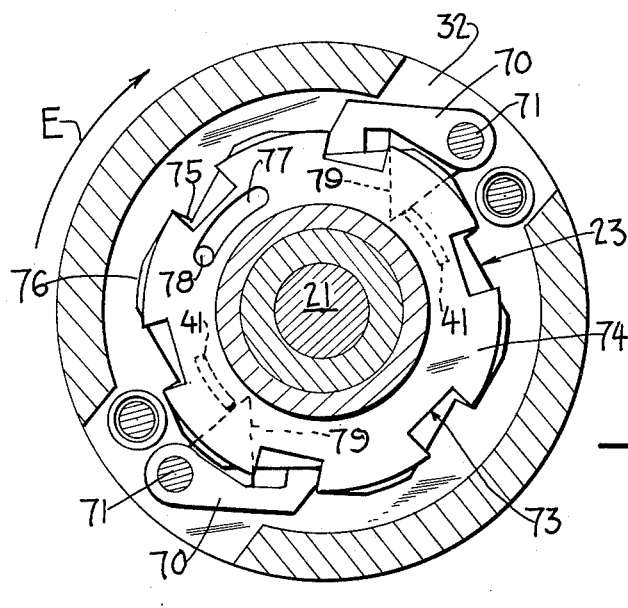
FIG. 11 is a radial cross-section on line 11—11 of FIG. 10.

In operation, FIGURE 11 shows the normal or high-gear position of the respective elements. The pawls 70 engage the notches 75 of the ratchet 73 which is rigid with the sun gear sleeve 24. Since the pawls 70 are mounted on the studs 71 which are secured to the reaction ring 30 and the torque-limiting plate 32, the rigid torque-comparing mechanism can be traced as follows: the torque-limiting plate 32, the brake-reaction ring 30, the ratchet pawls 70, and the ratchet 23 which is integral with the sun pinion 14 through its sleeve 24.

Assuming now that the torque exerted by the sun pinion 14 on the brake-reaction ring 30 exceeds the torque exerted on the brake-reaction ring 30 by the torque-limiting spring 22, the rigid torque-comparing assembly rotates in a clockwise direction as indicated by the arrow E in FIGURE 11. Thus the tripping lugs 41 lift the pawls 70 out-of-engagement with the respect notches 74 of the ratchet 23. Rotation of the ratchet 23 in a clockwise direction shifts it relative to the masking disc 73 until the pin 78 abuts the forward end, in the sense of the clockwise rotation, of the slot 77. Hence the masking disc 73 covers the notches 75 of the ratchet 23 and the pawls 70 can not enter these notches 75 although the torsion-limiting spring 22 returns the brake-reaction ring 30, the torque-limiting plate 31 and the pawls 70 to their normal or high-gear positions determined by the tripping lugs 33, riding in the holes 42 of the torque-limiting plate 31, as soon as the pawls 70 are released from the notches 75. Thus the ratchet 23 and the sun pinion 14 are free to rotate in clockwise direction and low-gear operation results. If coasting occurs, the sun pinion 14, and with it the ratchet 23, rotates in a counter-clockwise direction, i.e., in a direction opposite to that indicated by the arrow E in FIGURE 11. Thus the ratchet 23 turns relative to the masking disc 73 until the pin 78 again assumes the position in the slot 77 shown in FIGURE 11 and the notches 75 are no longer covered by the masking disc 73. Upon re-engagement of the pawls 70 with the notches 75 normal high-gear operation is resumed.

Operation of the coaster brakes (FIGURE 1) will now be described. A rotation of the pedal of the bicycle or the like in a counter-clockwise direction axially displaces the mating helical coupler 17 relative to the helical coupler 16. This axial displacement is transmitted by the planetary cage 15 to the brake-reaction ring 30 which carries the brake discs 36. The brake discs 36 cooperate with the brake discs 37 which are rigid with the brake-ground spline 38 to exert a braking action on the frame of the bicycle or the like.

Various changes and modifications of the described embodiments may be made without exceeding the scope of the present invention, and it is intended that the following claims be interpreted accordingly.

What is claimed is:

1. In a transmission for a bicycle or the like having a frame, the combination, comprising, a hub, an internal ring gear in said hub, a shaft coaxially extending within said hub and rigid with the frame, a sun pinion rotatably mounted on said shaft, a planetary pinion intermediate and meshing with said sun pinion and said internal ring gear, a drive for said planetary pinion operatively connected thereto, coupling means for connecting said drive for said planetary pinion to said hub for a common rotation around said shaft in response to the rotation of said sun pinion in a predetermined direction, said coupling means being inoperative to connect said drive to said hub when the rotation of said sun pinion in the predetermined direction is prevented; control means normally preventing rotation of said sun pinion in the predetermined direction, said control means being adapted to release said sun pinion for rotation in the predetermined direction when the torque exerted on said sun pinion by said driven planetary gear exceeds a predetermined limit, said means for returning said control means to their normal rotation-preventing condition when said hub rotates at a faster angular speed than said driven planetary pinion rotates around said shaft.

2. In a transmission for a bicycle or the like having a frame, the combination, comprising, a hub, an internal ring gear in said hub, a shaft coaxially extending within said hub and rigid with the frame, a sun pinion rotatably mounted on said shaft, a planetary gear intermediate and meshing with said sun pinion and said internal ring gear, a drive for said planetary gear operatively connected thereto, coupling means adapted to lock said planetary gear to said hub for a common rotation in response to the rotation of said sun pinion in a predetermined direction, said coupling means releasing said hub from said planetary gear when the angular speed of said hub slightly exceeds the angular speed with which said planetary gear is driven; resilient means anchored to the frame for controlling said coupling means, said resilient means being torque-preloaded in the predetermined directions, a torque-responsive mechanism for holding said sun pinion from rotation, said mechanism being disengaged in response to a predetermined torque applied to the pinion to permit rotation thereof; first shifting means adapted to cooperate with said torque-responsive mechanism to release said sun pinion for rotation in the predetermined direction when the torque exerted on said sun pinion by said planetary gear exceeds a predetermined limit; and second shifting means cooperating with said torque-reponsive mechanism adapted to reestablish the normal condition of said torque-responsive mechanism in response to the angular speed of said hub exceeding the angular speed around said shaft of said driven planetary gear.

3. In a transmission for a bicycle or the like as claimed in claim 2, said coupling means comprising a pawl connected to said planetary gear for a common rotation around said shaft, said pawl being shaped to engage at least one tooth of said internal ring gear when in an operative position, a stiff elongated spring secured to said pawl with one of its ends, the other end of said elongated spring engaging successive leading flanks on the teeth of said planetary gear, the leading flanks of the teeth of said planetary gear urging said spring and said pawl into its operative position when said planetary gear rotates said sun pinion in the predetermined direction.

4. In a transmission for a bicycle or the like as claimed in claim 3, two diametrically opposite arranged planetary gears, two pawls, one pawl associated with each of said gears, and two stiff elongated springs, one spring associated with each of said planetary gears and its associated pawl.

5. In a transmission for a bicycle or the like as claimed in claim 2, said coupling means comprising a pawl connected to said planetary gear for a common rotation around said shaft, a ratchet rigid with said hub, said pawl being shaped to engage at least one tooth of said ratchet when in an operative position, a stiff elongated spring secured to said pawl with one of its ends, the other end of said elongated spring engaging successive leading flanks on the teeth of said planetary gear, the leading flanks of the teeth of said planetary gear urging said spring and said pawl into its operative position when said planetary gear rotates said sun pinion in the predetermined direction.

6. In a transmission for a bicycle or the like as claimed in claim 2, said torque-responsive mechanism comprising a ratchet coaxial and rigid with said sun pinion, a ratchet pawl normally engaging said ratchet to prevent its rotation in the predetermined direction, said first shifting means disengaging said ratchet pawl from said ratchet when the torque exerted on said sun pinion by said planetary gear exceeds a predetermined limit, and said second shifting means re-engaging said ratchet pawl and said ratchet in response to the angular speed of said hub exceeding the angular speed of said driven planetary gear around said shaft.

7. In a transmission for a bicycle or the like as claimed in claim 6, said torque-responsive mechanism further comprising a torque-limiting member, said torque-preloaded resilient means being secured to said torque-limiting member, a control member having a normal and a shifted position, a control pawl pivoted to said control member and assuming a normal and a shifted position therewith, said control pawl being drivingly connected to said torque-limiting member for a common rotation in the predetermined direction when said control pawl is in its normal position, said ratchet pawl being pivoted to said control member, said ratchet pawl being in its ratchet-engaging position when said control pawl is in its normal position, said control pawl when in its shifted position releasing said torque-limiting member for independent rotation and forcing said ratchet pawl to disengage from said ratchet; said first shifting means being a lug rigid with the bicycle frame, said torque-limiting member being formed with a hole accommodating said lug and dimensioned for a relative angular displacement of said lug and said torque-limiting member over a predetermined angle, said lug displacing said control pawl from its normal to its shifted position in response to an angular displacement of the torque-responsive mechanism in the predetermined direction, whereby said control member assumes its shifted position in which said control pawl also assumes its shifted position; and said second shifting means being a drag spring wedged between said sun pinion and said control member, said drag spring urging said control member carrying said control pawl and said ratchet pawl in a direction opposite to the predetermined direction when said sun pinion rotates in a direction opposite to the predetermined direction returning said control member to its normal position and also returning said control pawl to its normal position.

8. In a transmission for a bicycle or the like as claimed in claim 1, said drive for said planetary pinion comprising a driving element and a driven element concentrically arranged on said shaft and rotatable thereon, said driving element rotating said driven element when rotated in the predetermined direction, said driving element axially displacing said driven element when rotated in the direction opposite to the predetermined direction, a first set of axially displaced brake discs rigid with the frame, a second set of axially displaced brake discs alternating with said first set of brake discs and shiftable with said driven element in an axial direction, whereby rotation of said driving element in a direction opposite to the predetermined direction will operate as a brake.

9. In a transmission for a bicycle or the like as claimed in claim 1, all elements of said combination with the exception of said hub being located within said hub.

10. In a transmission for a bicycle or the like, the combination comprising a hub, a normally-operative planetary high-ratio transmission, a direct-coupled low-ratio transmission, a common drive for said high-ratio transmission and said low-ratio transmission, torque responsive brake means for said high-ratio transmission, said torque responsive brake means being adapted to assume an operative condition in which said drive operatively connects said high-ratio transmission to said hub, and an inoperative condition in which said drive is ineffective to operatively connect said high-ratio transmission to said hub, said torque responsive brake means assuming its inoperative condition in response to the torque applied to said drive exceeding a predetermined value and assuming its operative condition in response to the angular speed of said hub slightly exceeding the angular speed of said drive, said low-ratio transmission being effective to directly couple said drive to said hub whenever the angular speed of said hub tends to decrease below the angular speed of said drive to maintain these two angular speeds substantially equal.

11. In an automatic transmission for a bicycle or the like having a frame, the combination, comprising a hub, an internal ring gear in said hub, a shaft coaxially extending within said hub and rigid with the frame, a sun pinion rotatably mounted on said shaft, a planetary pinion intermediate and meshing with said sun pinion and said internal ring gear, a drive for said planetary pinion operatively connected thereto, coupling means adapted to connect said planetary pinion and said hub, said coupling means, when operative, driving said hub with an angular speed equal to the angular speed of rotation of said planetary gear around said shaft, said coupling means being effective in response to the angular hub speed tending to decrease below the angular speed of said planetary gear around said shaft; and resiliently-urged control means normally preventing rotation of said sun pinion in the direction in which said drive is rotated to advance the bicycle, said control means being adapted to release said sun pinion for rotation in this direction when the torque exerted on said sun pinion by said driven planetary gear exceeds a predetermined limit, control means being returned to their normal rotation-preventing condition when said hub rotates at a faster angular speed than said planetary gear rotates around said shaft.

12. In an automatic transmission for a bicycle or the lie having a frame, the combination, comprising a hub, an internal ring gear in said hub, a shaft coaxially extending within said hub and rigid with the frame, a sun pinion rotatably mounted on said shaft, a planetary pinion intermediate and meshing with said sun pinion and said internal ring gear, a drive for said planetary pinion operatively connected thereto, coupling means for connecting said drive for said planetary pinion to said hub for a common rotation around said shaft in response to the rotation of said sun pinion in a predetermined direction, said coupling means becoming inoperative when the rotation of said sun pinion in the predetermined direction is prevented; and resiliently urged control means normally preventing rotation of said sun pinion in the predetermined direction, said control means being adapted to release said sun pinion for rotation in the predetermined direction when the torque exerted on said sun pinion by said driven planetary gear exceeds a predetermined limit, said control means being returned to their normal rotation-preventing condition when said hub rotates at a faster angular speed than said driven planetary pinion rotates around said shaft.

13. In an automatic transmission for a bicycle or the like as claimed in claim 12, said coupling means comprises a locking pawl and a pawl-controlling spring.

14. In an automatic transmission for a bicycle or the like as claimed in claim 12, said coupling means comprising a cone drive rotatably mounted on said shaft, further coupling means between said planetary pinion and said cone drive, said further coupling means permitting deviations within predetermined limits of the angular postion relative to said shaft of said cone drive and the axis of said planetary gear, said hub being formed with a conical surface, said cone drive being adapted to drivingly engage the conical surface of said hub, and cone-drive control means urging said cone drive to engage said conical surface in response to the rotation of the sun pinion in the predetermined direction and disengaging said cone drive from the conical surface of said hub when the rotation of said sun pinion in the predetermined direction is prevented.

15. In an automatic transmission for a bicycle or the like as claimed in claim 14, said cone drive comprising a plate having central hole and a substantially conical rim, said hub having an inwardly extending matching conical surface, said control means comprising a worm on said shaft drivingly connected to rotate at the speed of said drive for said planetary gear and an engaging spiral groove in the wall of the central hole of said plate.

16. In an automatic transmission for a bicycle or the like as claimed in claim 14, said further coupling means comprise a coupling member extending through a recess formed in said cone drive, said recess being wider than said coupling member, said coupling member drivingly connecting said planetary gear and said drive for said planetary gear.

17. In a transmission for a bicycle or the like having a frame, the combination comprising a hub, an internal ring gear in said hub, a shaft coaxially extending within said hub and rigid with the frame, a sun pinion rotatably mounted on said shaft, a planetary gear intermediate and meshing with said sun pinion and said internal ring gear, a drive for said planetary gear operatively connected thereto, coupling means adapted to connect said drive for said planetary gear to said hub for a common rotation around said shaft in response to the rotation of said sun pinion in a predetermined direction, said coupling means becoming inoperative when the rotation of said sun pinion in the predetermined direction is prevented; a torque-limiting member, torque-preloaded resilient means anchored to said frame and secured to said torque-limiting member, a ratchet pawl being pivoted to said torque-limiting member, a ratchet coaxial and rigid with said sun pinion, said ratchet pawl normally engaging said ratchet to prevent its rotation in the predetermined direction, a masking disc for said ratchet, said masking disc being angularly displaceable relative to said ratchet between an operative and an inoperative position, said masking disc when in its inoperative position permitting engagement of said ratchet pawl with said ratchet, said masking disc when in its operative position preventing engagement of said ratchet pawl with said ratchet, said masking disc being normally in its inoperative position; a lug rigid with the bicycle frame, said torque-limiting member being formed with a hole accommodating said lug and dimensioned for a relative angular displacement of said lug and said torque-limiting member over a predetermined angle, said lug disengaging said ratchet pawl from said ratchet and shifting said masking disc to its operative position in response to the rotation of said sun pinion in said predetermined direction, said ratchet pawl re-engaging said ratchet and said masking disc shifting to its inoperative position in response to a rotation of said sun pinion in a direction opposite to the predetermined direction.

References Cited in the file of this patent

UNITED STATES PATENTS

| | | |
|---|---|---|
| 2,741,934 | Douglas | Apr. 17, 1956 |
| 2,747,708 | Peterson | May 29, 1956 |